United States Patent [19]

Ohmae et al.

[11] Patent Number: 4,720,524
[45] Date of Patent: Jan. 19, 1988

[54] ADHESIVE RESIN COMPOSITION

[75] Inventors: Tadayuki Ohmae; Mitsuyuki Okada, both of Chiba; Hiroshi Nagai; Yutaka Mizumura, both of Shiga, all of Japan

[73] Assignees: Sumitomo Chemical Company, Ltd.; Toyobo Co., Ltd, both of Japan

[21] Appl. No.: 902,085

[22] Filed: Aug. 27, 1986

Related U.S. Application Data

[63] Continuation of Ser. No. 674,791, Nov. 26, 1984, abandoned.

[30] Foreign Application Priority Data

Nov. 26, 1983 [JP] Japan ................. 58-222796
Jun. 13, 1984 [JP] Japan ................. 59-121500

[51] Int. Cl.$^4$ ............................ C08L 67/02
[52] U.S. Cl. ..................... 525/173; 525/64; 525/108; 525/111; 525/166; 525/174; 525/176; 528/301; 528/305
[58] Field of Search ............. 528/301, 305; 525/176, 525/64, 173, 174

[56] References Cited

U.S. PATENT DOCUMENTS

| | | | |
|---|---|---|---|
| 3,657,389 | 4/1972 | Caldwell | 525/176 |
| 4,073,827 | 2/1978 | Okasaka | 525/176 |
| 4,094,721 | 6/1978 | Sturm | 428/480 |
| 4,155,952 | 5/1979 | McConnell | 525/173 |
| 4,172,859 | 10/1979 | Epstein | 525/176 |
| 4,217,426 | 8/1980 | McConnell | 525/173 |
| 4,299,933 | 11/1981 | McConnell | 525/176 |
| 4,368,295 | 1/1983 | Newton | 525/176 |
| 4,430,479 | 2/1984 | Merton | 525/176 |

FOREIGN PATENT DOCUMENTS 55-137154 10/1980 Japan ................. 525/176
WO83/02621 8/1983 PCT Int'l Appl. .

*Primary Examiner*—Patricia A. Short
*Attorney, Agent, or Firm*—Sughrue, Mion, Zinn, Macpeak, and Seas

[57] ABSTRACT

An adhesive resin composition is described, comprising: (A) a thermoplastic copolyester resin prepared from (1) a dicarboxylic acid component comprising from 40 to 100 mol % of terephthalic acid and from 0 to 60 mol % of other aromatic dicarboxylic acid and (2) a low molecular weight glycol component comprising from 40 to 100 mol % of 1,4-butanediol and from 0 to 60 mol % of diethylene glycol or 1,6-hexanediol and further from 0 to 10 mol %, based on the total carboxylic acid, of polytetramethylene glycol having a molecular weight of from 600 to 6,000, which has a melting point of from 90° to 160° C. and a reduced viscosity of at least 0.5; and (B) an ethylene copolymer having at least one functional group selected from an epoxy group, a carboxylic acid group, and a dicarboxylic anhydride gruop; and if desired, (C) a thermoplastic resin other than the resin (A), and if further desired, (D) a polyfunctional epoxy compound. This composition exhibits excellent adhesion to synthetic resins such as polyvinyl chloride, polyesters, and polyolefins and also to metals such as aluminum and has excellent adhesive durability against moisture.

1 Claim, No Drawings

ADHESIVE RESIN COMPOSITION

This is a continuation of application Ser. No. 674,791 filed Nov. 26, 1984, now abandoned.

FIELD OF THE INVENTION

The present invention relates to a novel adhesive resin composition. More particularly, it is concerned with an adhesive resin composition exhibiting excellent adhesion to synthetic resins such as polyvinyl chloride resins, polyester resins and polyolefin resins or metals and also having excellent adhesive durability against moisture.

BACKGROUND OF THE INVENTION

In general, thermoplastic copolyester resins have excellent flexibility and weather resistance and also exhibit excellent adhesion to various substrates and therefore, they are widely used as paints or adhesives. It is known that they exhibit excellent adhesion, in particular, to synthetic resins containing polar groups, such as soft or hard polyvinyl chloride resins, polyester resins, polycarbonate resins, ABS resins, and polyurethane resins. On the contrary, they exhibit no adhesion to polyolefin synthetic resins. It is also known that they exhibit adhesion to metals such as aluminum, lead, iron, and copper, but their adhesion is not always satisfactory as compared with that to synthetic resins containing polar groups such as polyvinyl chloride resins.

Another problem of the thermoplastic copolyester resins is that when they are used as adhesives to various substrates, their adhesive strength between the layers of the resulting laminated article decreases with a lapse of time because reduction in molecular weight occurs due to hydrolysis. Thus, laminated articles of synthetic resins and/or metals as produced using the above thermoplastic copolyester resins alone as adhesives are not sufficiently satisfactory in respect to adhesion from the practical viewpoint.

It has therefore been desired to develop resins exhibiting good adhesion to all kinds of substrates and also having adhesive durability against moisture, with the both being well balanced.

Still another problem of the thermoplastic copolyester resins is that their fabrication property is poor. That is, in laminating the polyester resins on substrates such as films and metals by commonly used fabrication techniques such as inflation, T-die extrusion, extrusion lamination, and coextrusion, they stick on and attach to a cooling roll and cannot be separated therefrom, which makes the fabrication impossible. Even if the fabrication is performed when the resulting film is once wound in the form of a coil and then is intended to again produce laminated articles by the off-line system, difficulties are encountered in unwinding because of blocking. Thus, the fabrication property is still poor. It has therefore been desired to develop resins which have excellent fabrication property and cause less film blocking.

SUMMARY OF THE INVENTION

An object of the present invention is to provide an adhesive resin composition containing a thermoplastic copolyester resin, which exhibits good adhesion to metals and synthetic resins such as polyolefin while retaining good adhesion to synthetic resins containing polar groups as inherent characteristic of the thermoplastic copolyester resins, is superior in fabrication property, causes less film blocking, and which is superior in adhesive durability against moisture.

That is, the present invention relates to an adhesive resin composition comprising:

(A) a thermoplastic copolyester resin prepared from (1) a dicarboxylic acid component comprising from 40 to 100 mol% of terephthalic acid and from 0 to 60 mol% of other aromatic dicarboxylic acid and (2) a low molecular weight glycol component comprising from 40 to 100 mol% of 1,4-butanediol and from 0 to 60 mol% of diethylene glycol or 1,6-hexanediol and further from 0 to 10 mol%, based on the total carboxylic acid, of polytetramethylene glycol having a number average molecular weight of from 600 to 6,000, which has a melting point of from 90° to 160° C. and a reduced viscosity of at least 0.5; and (B) an ethylene copolymer having at least one functional group selected from an epoxy group, a carboxylic acid group, and a dicarboxylic anhydride group; and if desired, (C) a different thermosplastic resin; and if further desired, (D) a polyfunctional epoxy compound.

DETAILED DESCRIPTION OF THE INVENTION

The dicarboxylic acid component used in the preparation of the thermoplastic copolyester resin (A) of the present invention comprises from 40 to 100 mol% of terephthalic acid and from 0 to 60 mol% of another aromatic dicarboxylic acid. Typical examples of other aromatic dicarboxylic acids are isophthalic acid, orthophthalic acid, and 2,6-naphthalenedicarboxylic acid. Of these compounds, isophthalic acid is most suitable from the industrial standpoint. Aliphatic dicarboxylic acids such as adipic acid may be used in an amount of up to about 10 mol%. However, addition of such aliphatic dicarboxylic acids in an amount exceeding about 10 mol% is not desirable since the ultimate product is poor in water resistance (resistance against hydrolysis). If the proportion of terephthalic acid is less than 40 mol%, the melting point of the resulting polyester is less than 90° C., which results in failure in anti-blocking properties and ease of workability as inherent characteristic of the composition of the present invention.

The low molecular weight glycol component comprises from 40 to 100 mol% of 1,4-butanediol and from 0 to 60 mol% of diethylene glycol or 1,6-hexanediol and further from 0 to 10 mol%, based on the total dicarboxylic acid component, of polytetramethylene glycol having a molecular weight of from 600 to 6,000. If the proportion of 1,4-butanediol is less than 40 mol%, the resulting polyester is undesirable because crystallinity decreases and the melting point is less than 90° C.

In the preparation of the thermoplastic copolyester resin (A) of the present invention, it is particularly preferred that the dicarboxylic acid component comprises from 60 to 95 mol% of terephthalic acid and from 40 to 5 mol% of isophthalic acid, and the low molecular weight glycol component comprises from 55 to 95 mol% of 1,4-butanediol and from 45 to 5 mol% of diethylene glycol or 1,6-hexanediol and further from 0.1 to 4 mol%, based on the total dicarboxylic acid component, of polytetramethylene glycol having a molecular weight of from 600 to 6,000. More specifically, the dicarboxylic acid component and the glycol component are freely chosen such that the resulting polyester has a melting point ranging from 90° to 160° C.

As described above, the melting point of the thermoplastic copolyester resin (A) is from 90° to 160° C. and more preferably, from 100° to 150° C. If the melting point exceeds 160° C., the resulting composition is poor in adhesion and workability. On the other hand, if it is below 90° C., the resulting composition fails to produce a film free from blocking.

The thermoplastic copolyester resin (A) suitable for the composition of the present invention has a reduced viscosity of at least 0.5. If the reduced viscosity is less than 0.5, not only mechanical properties are reduced whereby no satisfactory adhesion can be obtained, but also the composition is poor in anti-blocking properties and ease of workability.

The ethylene copolymer (B) containing at least one functional group selected from the group consisting of an epoxy group, a carboxylic acid group, and a dicarboxylic anhydride group is prepared by copolymerizing ethylene and an unsaturated monomer having the above functional group, which is copolymerizable with ethylene, such as $\alpha,\beta$-unsaturated glycidyl esters, $\alpha,\beta$-unsaturated glycidyl ethers, $\alpha,\beta$-unsaturated carboxylic acids, and their anhydrides, by known techniques such as high pressure radical polymerization, solution polymerization, and emulsion polymerization. Typical examples of such unsaturated monomers are glycidyl methacrylate, glycidyl acrylate, allyl glycidyl ether, 2-methylallyl glycidyl ether, acrylic acid, methacrylic acid, maleic acid, fumaric acid, itaconic acid, maleic anhydride, itaconic anhydride, and endo-cis-bicyclo(2:2:1)-5-heptene-2,3-dicarboxylic anhydride.

The amount of the unsaturated monomer added is from about 0.01 to 20 mol% and preferably from about 0.1 to 10 mol%.

In addition, copolymers resulting from graft polymerization of an unsaturated monomer having the above described functional group onto ethylene homopolymer or copolymer, as described in Japanese Patent Publication Nos. 18392/62 and 30546/77 and Japanese Patent Application (OPI) Nos. 147792/83 and 66391/76 (the term "OPI" as used herein means a "published unexamined Japanese patent application") can be used.

As the ethylene copolymer (B) used in the present invention, copolymers produced by copolymerization or graft polymerization of, as a third component, unsaturated ester monomers such as unsaturated carboxylic acid esters (e.g., methyl acrylate, ethyl acrylate, methyl methacrylate, and butyl acrylate) or unsaturated vinyl esters (e.g., vinyl acetate and vinyl propionate) can also be used in addition to the above described components.

The melt index of the ethylene copolymer (B) is chosen within such a range that the resulting composition is readily moldable. It is usually from 0.1 to 300 g/10 min and preferably from 0.5 to 50 g/10 min.

Most preferred as the ethylene copolymer (B) are epoxy group-containing ethylene copolymers.

Preferred examples of the different thermoplastic resin (C) used in the present invention are ethylene polymers, polyolefin elastomers, vinyl aromatic hydrocarbon polymers or copolymers, and (meth)acrylate polymers or copolymers. These polymers can be used singly or in combination.

The ethylene polymer which is one example of the thermoplastic resin (C) is at least one polymer selected from polyethylene and ethylene/unsaturated ester copolymers. These polymers can be produced by known techniques without specific restrictions, such as high pressure radical polymerization, solvent polymerization, and solution polymerization. Typical examples of the ethylene/unsaturated ester copolymers are ethylene/vinyl ester copolymers such as an ethylene/vinyl acetate copolymer and an ethylene/vinyl propionate copolymer, and ethylene/unsaturated carboxylic acid ester copolymers such as an ethylene/methyl methacrylate copolymer, an ethylene/methyl acrylate copolymer, an ethylene/ethyl acrylate copolymer, and an ethylene/butyl acrylate copolymer. When the ethylene polymer is the copolymer, the ethylene content is at least 50 mol% and a preferably from 70 to 99 mol%. The melt index of the ethylene polymer is from 0.01 to 300 g/10 min and preferably from 0.1 to 80 g/10 min.

Typical examples of the polyolefin elastomer which is also one example of the thermoplastic resin (C) are an ethylene/propylene copolymer rubber, an ethylene/propylene/non-conjugated diene copolymer rubber, an ethylene/butene copolymer rubber, an ethylene/isobutylene copolymer rubber, and atactic polypropylene. Of these polymers, an ethylene/propylene copolymer rubber, an ethylene/propylene/non-conjugated diene copolymer rubber, and an ethylene/butene copolymer rubber are particularly preferred.

The vinyl aromatic hydrocarbon polymer which is further one example of the thermoplastic resin (C) includes homo- and copolymers of vinyl aromatic hydrocarbons having from 8 to 20 carbon atoms and particularly, from 8 to 12 carbon atoms. Specific examples are polystyrene, poly-$\alpha$-methylstyrene, polyvinyl toluene, poly-$\beta$-methylstyrene, a styrene/acrylonitrile copolymer, and a styrene/acrylonitrile/butadiene copolymer. Of these polymers, polystyrene is preferred.

The (meth)acrylate polymer which is even further one example of the thermoplastic resin (C) is homo- and copolymers of monomers represented by the following general formula:

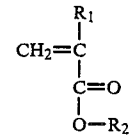

wherein $R_1$ is a hydrogen atom or a methyl group, and $R_2$ is an alkyl group having from 1 to 4 carbon atoms. Specific examples are polymethyl acrylate, polymethyl methacrylate, polyethyl acrylate, polybutyl acrylate, and a methyl methacrylate/butyl acrylate copolymer. Most preferred are polymethyl methacrylate and copolymers made mainly from methyl methacrylate. In addition, copolymers produced from the above monomers and other unsaturated monomers such as styrene and acrylonitrile can be used.

In addition, as the thermoplastic resin (C), polyisobutylene, polyisoprene, polybutadiene, a styrene/butadiene random copolymer, a styrene/butadiene block copolymer, and natural rubber can be used.

The polyfunctional epoxy compound (D) used in the present invention includes those of glycidyl ether type as prepared from epichlorohydrin or methylepichlorohydrin and compounds having at least two hydroxyl groups. Typical examples are a condensate of 4,4'-dihydroxydiphenyl-2,2'-propane (bisphenol A) and epichlorohydrin, a diglycidyl ether of bisphenol A, polyglycidyl ethers resulting from reaction of novolak-type phenol condensates, as prepared by condensation of phenolic compounds such as phenol and cresol, and formaldehyde, with epichlorohydrin, a triglycidyl ether of glycerine, and a diglycidyl ether of polyethylene glycol. The polyfunctional epoxy compound (D) further includes those of glycidyl ester type as prepared from epichlorohydrin or methylepichlorohydrin and compounds having at least two carboxyl groups or their anhydrides. Typical examples are diglycidyl esters of aromatic dibasic acids such as phthalic acid, isophthalic acid, terephthalic acid, tetrahydrophthalic acid, and hexahydrophthalic acid, diglycidyl esters of aliphatic dibasic acids such as succinic acid and adipic acid, diglycidyl esters of dimer acids (dicarboxylic acids having 36 carbon atoms in average), and esters resulting from the reaction of acid anhydrides such as phthalic anhydride, maleic anhydride, trimellitic anhydride, and pyromellitic anhydride, with epichlorohydrin.

In addition, epoxidized products of polybutadiene and diepoxidized products of dicyclopentadiene can be used. These polyfunctional epoxy compounds are commercially available under trade names, for example, Epikote (Shell Chemical Co., Ltd.) and Sumiepoxy (Sumitomo Chemical Co., Ltd.) and are widely used as starting materials for the usual epoxy resins. The polyfunctional epoxy compounds can be used singly or in combination.

The adhesive resin composition of the present invention contains the thermoplastic copolyester resin (A) in a proportion of from 40 to 80% by weight and preferably from 50 to 70% by weight. The total amount of the ethylene copolymer (B) and the thermoplastic resin (C) is from 60 to 20% by weight and preferably from 50 to 30% by weight. The proportion of the ethylene copolymer (B) in the total of the ethylene copolymer (B) and the thermoplastic resin (C) is from 5 to 100 % by weight and preferably from 10 to 80% by weight.

The amount of the polyfunctional epoxy compound (D) added is from 0 to 20 parts by weight and preferably from 1 to 10 parts by weight, per 100 parts by weight of the total of the components (A), (B) and (C).

If the component (A) is less than 40% by weight and the total amount of the components (B) and (C) exceeds 60% by weight, the adhesion of the resulting composition to polar group-containing synthetic resins, particularly a soft polyvinyl chloride resin, is seriously reduced; that is, the inherent characteristic of the component (A) is lost. If the total amount of the components (B) and (C) is less than 20% by weight and the component (A) exceeds 80% by weight, not only an improvement in adhesion to metals cannot be attained, but also extrusion moldability of the component (A) and blocking properties of the ultimate film cannot be improved. If the component (B) is not added, the resulting composition is poor in compatibility and its adhesion to various substrates decreases. Moreover, if the amount of the component (D) added exceeds 20 parts by weight, the ultimate film readily causes blocking and thus is not suitable for practical use.

With respect to the adhesive resin composition of the present invention, improved effects can be observed by the composition of only the thermoplastic copolyester resin (A) and the ethylene copolymer (B), but improved effects attained by a composition containing one or more of the thermoplastic resin (C) and the polyfunctional epoxy compound (D) in addition to the components (A) and (B) are greater.

That is, the addition of the component (C) is remarkably effective in improving the blocking properties of film and adhesion to metals. Of the resins of the component (C), the ethylene polymers are particularly suitable to control fluidity of the resulting composition during the film molding process. The addition of the vinyl aromatic hydrocarbon polymers, (meth)acrylate polymers, or polyolefin elastomers is effective in improving the adhesion to metals and the blocking properties of the ultimate film. If, however, the amounts of these compounds added are too high, the fluidity during the film molding process and the film strength decrease. Thus, it is preferred to combine them with the ethylene polymers in a suitable ratio.

Moreover, if the component (D) is added, the adhesion to metals and adhesive durability against moisture are more markedly improved.

The adhesive resin composition of the present invention can be produced by melt kneading the above components by the use of, e.g., a monoaxial extruder, a biaxial extruder, a Bumbury's mixer, and a heated roll. The components may be mixed at the same time, or they may be mixed one by one. The temperature necessary for the melt kneading is from 100° to 25° C., and the sufficient time is from 80 seconds to 10 minutes.

To the adhesive resin composition of the present invention, if desired, stabilizers such as antioxidants and ultraviolet absorbers, lubricants, inorganic fillers, surface active agents, antistatic agents, copper deactirator, flame retardants, foaming agents, colorants such as pigments, plasticizers, and the like can be added.

The adhesive resin composition of the present invention can be used for adhesion to olefin polymers such as polyethylene, an ethylene/unsaturated ester copolymer, polypropylene, an ethylene/α-olefin copolymer, and olefin polymers containing functional groups such as an epoxy group, a carboxylic acid group or a dicarboxylic acid (anhydride) group, etc.; halogen-containing polymers such as a vinyl chloride resin, a vinylidene chloride resin, a copolymer of vinyl chloride with vinyl acetate, vinylidene chloride, or a acrylate-type monomer, a vinyl chloride-grafted ethylene/vinyl acetate copolymer, a chlorinated polyolefin, a chlorosulfonated polyolefin, an ethylene/tetrafluoroethylene copolymer, and an ethylene/hexafluoropropylene copolymer; synthetic resins such as polyester resin, polyamide, a saponified product of an ethylene/vinyl acetate copolymer, an ABS resin, a polycarbonate resin, a polyurethane resin, etc.; metals such as aluminum, iron, nickel, zinc, lead, copper, and chromium, glass, procelain, paper, wood, etc. In particular, it exhibits good adhesion to both synthetic resins such as a soft or hard polyvinyl chloride resin, a polyester resin, an ABS resin, a polycarbonate resin, and a polyurethane resin, and metals such as aluminum, iron, lead, and copper.

The adhesive resin composition of the present invention has an excellent fabrication property. Thus, it can be fabricated by techniques commonly used for plastics, such as inflation, T-die extrusion, and extrusion lamination. Furthermore, the thus-produced film less causes blocking.

There are no particular restrictions with respect to the method of producing laminated articles using the adhesive resin composition of the present invention, and any suitable techniques such as a lamination process, a coating process, or a combination thereof can be applied. For example, a method in which the adhesive resin composition of the present invention is interposed in the form of, for example, film, sheet, powder, or pellets, between two substrates, followed by heating at temperatures higher than the melting point of the composition and press bonding, and a method in which the adhesive resin composition of the present invention is coated on one substrate by an extrusion coating process, a dry lamination process, a coextrusion molding process, or a process comprising applying in the form of powder of a solution followed by heating and, thereafter, another substrate is superposed on the former substrate, heated at temperatures higher than the melting point of the composition, and press bonded can be employed. The adhesion is generally carried out at a temperature of from 70° to 250° C.

Moreover, the adhesive resin composition of the present invention can be used as an adhesive layer for metal wrapped-cables (for communication and transmission of electricity) of aluminum, lead, or copper in which a sheath layer is made of a soft polyvinyl chloride resin. Thus, the adhesive resin composition of the present invention is industrially very meaningful.

The present invention is described in greater detail with reference to the following examples, although it is not intended to be limited thereto.

Physical properties were measured as follows.

(1) Melting point of thermoplastic copolyester resin (A):

A resin sample extended and shaped in a string form was set up in a melting point-measuring apparatus equipped with a polarization microscope such that the strings were placed at right angles each other. When the temperature was gradually elevated, a temperature at which the polarized image disappeared was read and determined as the melting point of the resin.

(2) Reduced viscosity of thermoplastic copolyester resin (A):

With respect to a solution of a resin sample dissolved in a phenol/tetrachloroethane (60:40 by weight) mixed solvent (concentration: 0.1 g/25 ml), a dropping time (in seconds) was measured using an Ubbelohde's viscometer to calculate the reduced viscosity.

(3) Extrusion moldability:

A 50 to 60 micron thick film was fabricated by the use of a 20 mm $\phi$ T-die extruder (manufactured by Tanabe Plastic Co., Ltd.) maintained at 170° C. During this film fabrication process, the condition in which the film sticked or attached to the cooling roll was examined. The rating used for evaluation was as follows:

X: The film attaches to the cooling roll and the fabrication is impossible.

Δ: The film somewhat attaches to the cooling roll.

o: No attachment of the film to the cooling roll occurs.

(4) Blocking property of film:

A 50 to 60 micron thick film was fabricated in the same manner as in (3) above and then wound in the form of coil. The thus-wound film was allowed to stand for one day. Then it was unwound, and easiness of unwinding was evaluated. The rating used for evaluation was as follows.

X: It is very difficult to unwind.

Δ: It is somewhat difficult to unwind.

o: The unwinding is very easy.

(5) Adhesion between soft polyvinyl chloride resin and aluminum (S-PVC/Al)—adhesive durability against moisture:

A 50 to 60 micron thick film of the adhesive resin composition was interposed between a soft polyvinyl chloride resin (S-PVC) sheet and soft aluminum (Al), and adhesion was effected under conditions of temperature of 180° C., time of 5 minutes, and pressure of 10 kg/cm$^2$. The thus-produced sheet was cut to prepare a 10 mm wide test piece. This test piece was soaked in hot water maintained at 70° C. for a given time. Then, the peeling strength of the resulting test piece was measured at a tensile speed of 100 mm/min in the condition that the aluminum plate was bent at an angle of 180°.

(6) Adhesion to polyethylene terephthalate resin:

A 50 to 60 micron thick film of the adhesive resin film was interposed between films of Lumirror (polyester film manufactured by Toray Industries, Inc., thickness: 75 microns), and adhesion was effected under conditions of temperature of 180° C., time of 5 minutes, and pressure of 10 kg/cm$^2$. The thus-produced sheet was cut to prepare a 10 mm wide test piece. Then the peeling strength of the resulting test piece was measured at a tensile speed of 100 mm/min in the condition that one of the Lumirror films was bent at an angle of 180°.

The substrates used in the above adhesion tests were as follows.

Soft aluminum: JIS-H4000, A-1050R-O (150$\mu$ thick tape)

Soft polyvinyl chloride resin: A mixture of 100 parts by weight of Sumilit SX-13 (a polyvinyl chloride resin, manufactured by Sumitomo Chemical Co., Ltd.), 60 parts by weight of dioctyl terephthalate, 10 parts by weight of calcium carbonate, 3 parts by weight of tribasic lead sulfate, and 1 part by weight of dibasic lead phosphite was kneaded at 150° C. for 5 minutes by means of a roll and then extruded in a 2 mm thick sheet.

PREPARATION EXAMPLE

Preparation of Thermoplastic Copolyester Resins

In a reaction vessel equipped with a stirrer, a thermometer, and a reflux condenser were placed 582 parts by weight of dimethyl terephthalate, 194 parts by weight of dimethyl isophthalate, 108 parts by weight of 1,4-butanediol, 85 parts by weight of diethylene glycol, 40 parts by weight of polytetramethylene glycol having a molecular weight of 1,000, and 0.42 part by weight of titanium tetrabutoxide, and the mixture was subjected to an ester exchange reaction at 160° to 210° C. for 4 hours.

Then the reaction temperature was raised to 250° C. and the pressure was reduced to 5 mmHg over 40 minutes. A polycondensation reaction was conducted under a reduced pressure of 0.3 mmHg or less over 90 minutes.

The thus-prepared copolyester resin (A-) had a melting point of 124° C. and a reduced viscosity of 0.88. NMR analysis showed that the copolyester resin was a polycondensate of a dicarboxylic acid component consisting of 75 mol% of terephthalic acid and 25 mol% of isophthalic acid and a glycol component consisting of 64 mol% of 1,4-butanediol, 35 mol% of diethylene glycol, and 1 mol% of polytetramethylene glycol.

In the same manner as above, copolyester resins of the present invention ((A-2) to (A-4)) and comparative polyester resins ((A-5) to (A-10)) were prepared. The monomer compositions and characteristics of the copolyester resins are shown in Table 1.

TABLE 1

| | Resins of the Present Invention | | | | Comparative Resins | | | | | |
|---|---|---|---|---|---|---|---|---|---|---|
| | (A-1) | (A-2) | (A-3) | (A-4) | (A-5) | (A-6) | (A-7) | (A-8) | (A-9) | (A-10) |
| Dicarboxylic Acid Component (mol %) | | | | | | | | | | |
| Terephthalic Acid | 75 | 85 | 65 | 60 | 70 | 75 | 30 | 75 | 60 | 100 |
| Isophthalic Acid | 25 | 15 | 35 | 40 | 30 | 25 | 70 | 25 | — | — |
| Adipic Acid | — | — | — | — | — | — | — | — | 40 | — |
| Glycol Component (mol %) | | | | | | | | | | |
| 1,4-Butanediol | 64 | 56 | 78 | 58 | 100 | 64 | 65 | — | 70 | 100 |
| 1,6-Hexanediol | — | — | — | 39 | — | — | — | — | — | — |
| Diethylene Glycol | 35 | 41 | 22 | — | — | 35 | 35 | 100 | 30 | — |
| Polytetramethylene Glycol | 1 | 3 | — | 3 | — | 1 | — | — | — | — |
| Characteristic Values | | | | | | | | | | |
| Reduced Viscosity (dl/g) | 0.88 | 1.10 | 0.92 | 0.90 | 0.80 | 0.32 | 0.95 | 0.85 | 1.12 | 0.75 |
| Melting Point (°C.) | 124 | 136 | 116 | 130 | 178 | 123 | * | * | 115 | 243 |

Note:
*The melting point was difficult to measure because of low crystallinity; it was indefinite.

EXAMPLES 1 TO 6 AND COMPARATIVE EXAMPLES 1 TO 5

The copolyester resin (A-2) as shown in Table 1, copolymer (B-1), as an epoxy group-containing ethylene copolymer, having a melt index of 7 g/10 min, a glycidyl methacrylate content of 10% by weight, and a vinyl acetate content of 5% by weight, and an ethylene/vinyl acetate copolymer (C-1) having a melt index of 6 g/10 min and a vinyl acetate content of 10% by weight or Esbrite 8 (C-2) (polystyrene, manufactured by Nippon Polystyrene Kogyo Co., Ltd.) were mixed in a ratio as shown in Table 2, and then again granulated at 190° C. by the use of a 30 mm φ extruder. The thus-prepared adhesive resin composition was fabricated into a 50 to 60 micron thick film by the use of a 20 mm φ T-die extruder. This film was tested for the adhesion, and the results are shown in Table 2.

As comparative examples, the same procedure as above was carried out except that (A-2) and (B-1) were used alone, (B-1) was not added, and the copolyester resin (A-9) as shown in Table 1 was used. The results are shown in Table 2.

TABLE 2

| | Composition (wt %) | | | | | Extrusion Moldability | Blocking of Film | Adhesive Durability against Moisture (kg/cm) | | |
|---|---|---|---|---|---|---|---|---|---|---|
| | (A-2) | (A-9) | (B-1) | (C-1) | (C-2) | | | 0 day | 10 days | 20 days |
| Example 1 | 80 | — | 20 | — | 1 | ○ | ○~Δ | 2.1 | 2.1 | 2.0 |
| Example 2 | 70 | — | 30 | — | — | ○ | ○~Δ | 2.2 | 2.4 | 1.8 |
| Example 3 | 70 | — | 10 | 20 | — | ○ | ○ | 2.6 | 2.5 | 2.0 |
| Example 4 | 60 | — | 10 | 30 | — | ○ | ○ | 1.8 | 1.3 | 1.3 |
| Example 5 | 70 | — | 10 | 5 | 15 | ○ | ○ | 2.3 | 1.9 | 1.8 |
| Example 6 | 60 | — | 10 | 15 | 15 | ○ | | 2.2 | 1.7 | 1.7 |
| Comparative Example 1 | 100 | — | — | — | — | Δ~X | —(1) | 1.2(1) | 1.1(1) | 1.1(1) |
| Comparative Example 2 | 60 | — | — | 40 | — | ○ | ○ | 1.2 | — | — |
| Comparative Example 3 | — | 70 | 30 | — | — | Δ | Δ | 2.0 | 0.5 | 0.2 |
| Comparative Example 4 | — | 60 | 10 | 15 | 15 | ○~Δ | ○~Δ | 2.3 | 0.8 | 0.2 |
| Comparative Example 5 | — | — | 100 | — | — | ○ | ○ | 0.2 | — | — |

(1)Evaluation was conducted using a press-molded film since film unwinding was impossible.

EXAMPLES 7 TO 9 AND COMPARATIVE EXAMPLES 6 TO 8

A mixture of 65% by weight of the copolymer resin (A-1), (A-3), or (A-4) as shown in Table 1, 10% by weight of (B-1) used in Example 1, and 25% by weight of (C-1) used in Example 1 was evaluated in the same manner as in Example 1. The results are shown in Table 3.

As comparative examples, the same procedure as above was repeated except that the copolyester resins (A-1), (A-3) and (A-4) were each used alone. The results are shown in Table 3.

TABLE 3

| | Copolyester Resin | Extrusion Moldability | Blocking of Film | Adhesive Durability against Moisture (kg/cm) | | |
|---|---|---|---|---|---|---|
| | | | | 0 day | 10 days | 20 days |
| Example 7 | (A-1) | ○ | ○ | 2.4 | 2.3 | 2.0 |
| Example 8 | (A-3) | ○ | ○ | 2.2 | 2.0 | 1.8 |
| Example 9 | (A-4) | ○ | ○ | 2.4 | 2.2 | 2.1 |
| Comparative Example 6 | (A-1) | Δ~X | —(1) | — | — | — |
| Comparative Example 7 | (A-3) | Δ~X | —(1) | — | — | — |

TABLE 3-continued

| | Copolyester Resin | Extrusion Moldability | Blocking of Film | Adhesive Durability against Moisture (kg/cm) | | |
|---|---|---|---|---|---|---|
| | | | | 0 day | 10 days | 20 days |
| Comparative Example 8 | (A-4) | Δ~X | —[1] | — | — | — |

[1] Film unwinding was impossible.

COMPARATIVE EXAMPLES 9 TO 11

The same procedure of Example 7 was repeated except that the copolyester resin (A-6), (A-7) or (A-8) was used alone. The results are shown in Table 4.

TABLE 4

| | Copolyester Resin | Extrusion Moldability | Blocking of Film | Adhesive Durability against Moisture (kg/cm) | | |
|---|---|---|---|---|---|---|
| | | | | 0 day | 10 days | 20 days |
| Comparative Example 9 | (A-6) | Δ | Δ | 1.0 | 0.8 | 0.8 |
| Comparative Example 10 | (A-7) | Δ~X | —[1] | — | — | — |
| Comparative Example 11 | (A-8) | Δ~X | —[1] | — | — | — |

[1] Film unwinding was impossible.

The composition prepared using the copolyester resin having a reduced viscosity of 0.32 exhibited only very low adhesion. With the compositions prepared using the copolyester resins having a low melting point, the ultimate films readily caused blocking; they are not suitable for practical use.

COMPARATIVE EXAMPLES 12 AND 13

A mixture of 70% by weight of the copolyester resin (A-5) or (A-10) as shown in Table 1, 10% by weight of (B-1) used in Example 1, and 20% by weight of (C-1) used in Example 1 was prepared and again granulated at 250° C. by the use of a 30 mm φ extruder. The thus-prepared composition was fabricated into a 50 to 60 micron thick film by the use of a 20 mm φ T-die extruder.

Using this film, adhesion was carried out under conditions of temperature of 180° C., time of 5 minutes, and pressure of 10 kg/cm². For both the compositions containing (A-5) and (A-10), the adhesive durability against moisture was 0 kg/cm. When the adhesion was conducted under conditions of temperature of 250° C., time of 5 minutes, and pressure of 10 kg/cm², the adhesive durability against moisture was 0.9 kg/cm for the composition containing (A-5), and 0.4 kg/cm for the composition containing (A-10). That is, they exhibited very low adhesion.

EXAMPLES 10 TO 14

A mixture of 65% by weight of the copolyester resin (A-2) as shown in Table 1, 25% by weight of (C-1) used in Example 1, and 10% by weight of an ethylene copolymer (B) as shown in Table 5 was prepared and evaluated in the same manner as in Example 1. The results are shown in Table 5.

TABLE 5

| | Ethylene Copolymer (B)[1] | Extrusion Moldability | Blocking of Film | Adhesive Durability against Moisture (kg/cm) | | |
|---|---|---|---|---|---|---|
| | | | | 0 day | 10 days | 20 days |
| Example 10 | (B-2) | ○ | ○ | 2.0 | 2.1 | 1.5 |
| Example 11 | (B-3) | ○ | ○ | 2.3 | 2.3 | 2.2 |
| Example 12 | (B-4) | ○ | ○ | 1.8 | 1.8 | 1.5 |
| Example 13 | (B-5) | ○ | ○ | 1.6 | 1.7 | 1.4 |
| Example 14 | (B-6) | ○ | ○ | 1.8 | 1.8 | 1.6 |

[1] (B-2): Ethylene copolymer having a glycidyl methacrylate content of 12% by weight
(B-3): Ethylene copolymer having a glycidyl methacrylate content of 16% by weight and a vinyl acetate content of 6% by weight
(B-4): Polymer resulting from graft polymerization of 0.15% by weight of maleic anhydride to an ethylene/vinyl acetate copolymer having a vinyl acetate content of 8% by weight
(B-5): Ethylene/acrylic acid copolymer having an acrylic acid content of 8% by weight
(B-6): Ethylene/acrylic acid/tert-butyl acrylate copolymer having an acrylic acid content of 3% by weight and a tert-butyl acrylate content of 8% by weight

EXAMPLES 15 TO 20

A mixture of copolyester resin (A-2) as shown in Table 1, 10% by weight of (B-1) used in Example 1, and 25% by weight of a thermoplastic resin (C) as shown in Table 6 was prepared and evaluated in the same manner as in Example 1. The results are shown in Table 6. For all the compositions, extrusion moldability and blocking of film were good: "○".

TABLE 6

| | Thermoplastic Resin[1] (C) | Adhesive Durability Against Moisture (kg/cm) | | |
|---|---|---|---|---|
| | | 0 day | 10 days | 20 days |
| Example 15 | (C-1):10, (C-3):15 | 2.2 | 2.1 | 1.9 |
| Example 16 | (C-4):25 | 2.1 | 2.2 | 1.9 |
| Example 17 | (C-1):10, (C-4):15 | 2.0 | 2.0 | 1.8 |
| Example 18 | (C-1):10, (C-5):15 | 1.9 | 1.9 | 1.5 |
| Example 19 | (C-1):10, (C-6):15 | 1.9 | 1.8 | 1.5 |

TABLE 6-continued

| Thermoplastic Resin[1] (C) | Adhesive Durability Against Moisture (kg/cm) | | |
|---|---|---|---|
| | 0 day | 10 days | 20 days |
| Example 20 (C-1):10, (C-7):15 | 1.9 | 1.9 | 1.7 |

[1](C-1): Ethylene/vinyl acetate copolymer (vinyl acetate content: 10% by weight)
(C-3): Polymethyl methacrylate resin (Sumipex B LO-6, produced by Sumitomo Chemical Co., Ltd.)
(C-4): Low density polyethylene (melt index: 7 g/10 min)
(C-5): 1,2-Polybutadiene (JSR RB820, produced by Japan Synthetic Rubber Co., Ltd.)
(C-6): Ethylene/butene copolymer rubber (Tafmer A4090, produced by Mitsui Petrochemical Industries, Ltd.)
(C-7): Ethylene/propylene copolymer rubber (Tafmer P0180, produced by Mitsui Petrochemical Industries, Ltd.)

EXAMPLES 21 TO 25 AND COMPARATIVE EXAMPLE 14

Films produced from the compositions of Examples 3, 4, 5, 6, and 14 were tested for the adhesive durability against moisture according to procedure as described below.

For comparison, a film produced from the composition of Comparative Example 4 was evaluated in the same manner as above.

The results are shown in Table 7.

Evaluation Method

A soft polyvinyl chloride resin sheet (2 mm)/film of the composition (50 to 60μ)/epoxy group-containing ethylene copolymer (*) film (50μ)/soft aluminum (200μ) structure was prepared and bonded together under conditions of temperature of 180° C., time of 5 minutes, and pressure of 10 kg/cm². The thus-prepared laminate was cut to produce a 10 mm wide test piece. This test piece was then soaked in hot water maintained at 70° C. for a given period of time, and its peeling strength was measured at a tensile speed of 100 mm/min in the condition that the soft aluminum was bent at an angle of 180°.

*: Ethylene copolymer having a glycidyl methacrylate content of 10% by weight, a vinyl acetate content of 5% by weight, and a melt index of 7 g/10 min.

TABLE 7

| | Adhesive Resin Composition | Adhesive Durability Against Moisture (kg/cm) | | |
|---|---|---|---|---|
| | | 0 day | 10 days | 20 days |
| Example 21 | Example 3 | 4.4 | 5.6 | 5.8 |
| Example 22 | Example 4 | 4.8 | 4.6 | 2.6 |
| Example 23 | Example 5 | 4.0 | 3.9 | 3.7 |
| Example 24 | Example 6 | 4.8 | 4.6 | 3.0 |
| Example 25 | Example 14 | 4.9 | 5.1 | 5.1 |
| Comparative Example 14 | Comparative Example 4 | 5.8 | 1.4 | 0.3 |

EXAMPLES 26 TO 34 AND COMPARATIVE EXAMPLES 15 TO 19

The copolyester resin (A-2), an ethylene copolymer (B-1) having a melt index of 7 g/10 min, a glycidyl methacrylate content of 10% by weight, and a vinyl acetate content of 5% by weight, an ethylene/vinyl acetate copolymer (C-1) having a melt index of 6 g/10 min, and a vinyl acetate content of 10% by weight, or polystyrene (C-2) (Esbrite, produced by Nippon Polystyrene Kogyo Co., Ltd.), and a polyfunctional epoxy compound (D-1) (Sumiepoxy ESCN-220 HH, produced by Sumitomo Chemical Co., Ltd.; o-cresol novolak-type epoxy resin having a softening point of 89° C. and an epoxy equivalent of 216) were mixed in a ratio as shown in Table 8 and again granulated by the use of a 30 mm φ extruder. The thus-prepared adhesive resin composition was fabricated into a 50 to 60 micron thick film at 170° C. by the use of a 20 mm φ T-die extruder. This film was tested for adhesion, and the results are shown in Table 8.

As comparative examples, the above procedure was repeated except that (A-2) and (B-1) were each used alone, an (A-2)/(D-1) mixture and a (B-1)/(D-1) mixture were each used, the composition of Example 28 not containing (B-1) was used, and the comparative copolyester resin (A-9) of Table 1 was used in place of (A-2) in Example 28.

The results are shown in Table 8.

TABLE 8

| | Composition (wt %) | | | | | | Extrusion Moldability | Blocking of Film | Adhesive Durability against Moisture (kg/cm) | | |
|---|---|---|---|---|---|---|---|---|---|---|---|
| | (A-2) | (A-9) | (B-1) | (C-1) | (C-2) | (D-1) | | | 0 day | 20 days | 40 days |
| Example 26 | 70 | — | 30 | — | — | 5 | O | O~Δ | 3.7 | 3.0 | 2.9 |
| Example 27 | 70 | — | 20 | 10 | — | 5 | O | O~Δ | 3.3 | 3.0 | 2.7 |
| Example 28 | 65 | — | 10 | 25 | — | 5 | O | O | 3.2 | 2.6 | 2.4 |
| Example 29 | 65 | — | 20 | 15 | — | 5 | O | O | 3.9 | 3.1 | 3.1 |
| Example 30 | 65 | — | 10 | 10 | 15 | 5 | O | O | 2.9 | 1.9 | 1.6 |
| Example 31 | 50 | — | 10 | 40 | — | 5 | O | O | 2.2 | 1.9 | 1.5 |
| Example 32 | 65 | — | 10 | 25 | — | 1 | O | O | 2.3 | 2.2 | 1.3 |
| Example 33 | 65 | — | 10 | 25 | — | 10 | O~Δ | ~Δ | 3.9 | 2.8 | 2.4 |
| Example 34 | 65 | — | 10 | 25 | — | — | O | | 2.2 | 1.8 | 0.8 |
| Comparative Example 15 | 100 | — | — | — | — | 5 | X | — | 2.0[1] | 1.7[1] | 1.7[1] |
| Comparative Example [1] | 100 | — | — | — | — | — | Δ~X | — | 1.2[1] | 1.1[1] | 1.1[1] |
| Comparative Example 16 | — | — | 100 | — | — | 5 | O | O | 0.2 | — | — |
| Comparative Example 17 | — | — | 100 | — | — | — | O | O | 0.2 | — | — |
| Comparative Example 18 | 65 | — | — | 35 | — | 5 | O | O | 1.3 | — | — |
| Comparative Example 19 | — | 65 | 10 | 10 | 15 | 5 | O~Δ | O~Δ | 2.3 | 0.7 | 0.3 |

[1]A press molded film was used for evaluation since the above-prepared film was impossible to unwind.

EXAMPLES 35 TO 40

The procedure of Example 28 was repeated except that the copolyester resin (A-2) as shown in Table 1 was replaced by (A-1), (A-3), or (A-4) (Examples 35 to 37). The results are shown in Table 9.

The procedure of Example 28 was also repeated except that the polyfunctional epoxy compound (D-1) was not added (Examples 38 to 40). The results are shown in Table 9.

When a copolyester resin is used alone, the resulting composition is not satisfactory in extrusion moldability and film blocking. That is, as shown in Comparative Examples 6 and 7, extrusion moldability was $\Delta \sim X$ and with regard to film blocking, the film was impossible to unwind.

TABLE 9

| | Copolyester Resin | Extrusion Moldability | Blocking of Film | Adhesive Durability against Moisture (kg/cm) | | |
|---|---|---|---|---|---|---|
| | | | | 0 day | 10 days | 20 days |
| Example 35 | (A-1) | O | O | 3.1 | 2.5 | 2.0 |
| Example 36 | (A-3) | O | O | 3.0 | 2.6 | 1.9 |
| Example 37 | (A-4) | O | O | 3.2 | 2.5 | 2.2 |
| Example 38 | (A-1) | O | O | 2.4 | 2.0 | 0.9 |
| Example 39 | (A-3) | O | O | 2.2 | 1.8 | 0.6 |
| Example 40 | (A-4) | O | O | 2.4 | 2.1 | 0.9 |

COMPARATIVE EXAMPLES 20 TO 22

The procedure of Example 28 was repeated except that the copolyester resin (A-2) was replaced by (A-6), (A-7) or (A-8). The results were as follows.

Adhesive resin composition containing (A-6) with a low reduced viscosity of 0.32:
Extrusion moldability: $\Delta$
Blocking of film: $\Delta$
Adhesive durability against moisture: 0 day . . . 1.0 kg/cm, 20 days . . . 0.9 kg/cm That is, the composition exhibited very low adhesion.

Adhesive resin composition containing (A-7) or (A-8) with a low melting point:
Extrusion moldability: $\Delta \sim X$
Blocking of film: The film was impossible to unwind and is not suitable for practical purposes.

COMPARATIVE EXAMPLES 23 AND 24

In Example 27, the copolyester resin (A-2) as shown in Table 1 was replaced by comparative resins (A-5) or (A-10). That is, the comparative resin (A-5) or (A-10) was mixed in the same ratio as in Example 27, and again granulated at 250° C. by the use of a 30 mm $\phi$ extruder. The resulting composition was fabricated into a 50 to 60 micron thick film at 250° C. by the use of a 20 mm $\phi$ T-die extruder. Adhesion was carried out under the usual conditions of temperature of 180° C., time of 5 minutes, and pressure of 10 kg/cm². For both the compositions, the adhesive durability against moisture was 0 kg/cm; that is, they did not exhibit adhesion at all. The results obtained under the conditions of temperature of 250° C., time of 5 minutes, and pressure of 10 kg/cm² were as follows.
Composition containing (A-5) . . . 1.3 kg/cm
Composition containing (A-10) . . . 1.0 kg/cm
That is, they exhibited only very low adhesion.

EXAMPLES 41 TO 50

The procedure of Example 28 was repeated except that the ethylene copolymer (B-1) was replaced by (B-2), (B-3), (B-4), (B-5), or (B-6) (Examples 41 to 45). The results are shown in Table 10.

The results obtained when the polyfunctional epoxy compound (D-1) was not added (Examples 46 to 50) are also shown in Table 10.

For the compositions of Examples 41 to 50, extrusion moldability and film blocking were good: "O".

TABLE 10

| | Type of Ethylene Copolymer[1] | Adhesive Durability Against Moisture (kg/cm) | | |
|---|---|---|---|---|
| | | 0 day | 20 days | 40 days |
| Example 41 | (B-2) | 2.6 | 2.4 | 1.8 |
| Example 42 | (B-3) | 3.1 | 2.4 | 2.0 |
| Example 43 | (B-4) | 2.3 | 1.9 | 1.1 |
| Example 44 | (B-5) | 2.1 | 2.0 | 1.0 |
| Example 45 | (B-6) | 2.3 | 2.0 | 1.3 |
| Example 46 | (B-2) | 2.0 | 1.5 | 0.6 |
| Example 47 | (B-3) | 2.3 | 2.2 | 0.9 |
| Example 48 | (B-4) | 1.8 | 1.5 | 0.3 |
| Example 49 | (B-5) | 1.6 | 1.4 | 0.2 |
| Example 50 | (B-6) | 1.8 | 1.6 | 0.4 |

[1]See Table 5.

EXAMPLES 51 TO 62

The procedure of Example 28 was repeated except that the thermoplastic resin (C-1) was replaced by (C-4), or a mixture of 10 parts by weight of (C-1) and 15 parts by weight of (C-3), (C-5), (C-6) or (C-7) (Examples 51 to 56). The results are shown in Table 11.

The results obtained when the epoxy compound (D-1) used in Examples 51 to 56 was not added (Examples 57 to 62) are shown also in Table 11.

For all the compositions of Examples 51 to 62, extrusion moldability and film blocking were good: "O".

TABLE 11

| | Type of Thermoplastic Resin[1] | Adhesive Durability Against Moisture (kg/cm) | | |
|---|---|---|---|---|
| | | 0 day | 20 days | 40 days |
| Example 51 | (C-4) | 2.5 | 2.0 | 1.5 |
| Example 52 | (C-1)/(C-4) | 2.5 | 2.0 | 1.8 |
| Example 53 | (C-1)/(C-3) | 2.7 | 2.3 | 2.0 |
| Example 54 | (C-1)/(C-5) | 2.2 | 2.0 | 1.3 |
| Example 55 | (C-1)/(C-6) | 2.1 | 1.9 | 1.0 |
| Example 56 | (C-1)/(C-7) | 2.2 | 1.9 | 1.2 |
| Example 57 | (C-4) | 2.1 | 1.9 | 0.6 |
| Example 58 | (C-1)/(C-4) | 2.0 | 1.8 | 0.3 |
| Example 59 | (C-1)/(C-3) | 2.2 | 1.9 | 0.8 |
| Example 60 | (C-1)/(C-5) | 1.9 | 1.5 | 0.2 |
| Example 61 | (C-1)/(C-6) | 1.9 | 1.5 | 0.3 |
| Example 62 | (C-1)/(C-7) | 1.9 | 1.7 | 0.3 |

[1]See Table 6.

EXAMPLES 63 TO 65

The procedure of Example 28 was repeated except that a polyfunctional epoxy compound (D-2) (Sumiepoxy ESA-014, bisphenol A-type epoxy resin having an epoxy equivalent of 960, produced by Sumitomo Chemical Co., Ltd.) was used in place of the polyfunctional epoxy compound (D-1) in an amount as shown in Table 12. The results are shown in Table 12.

TABLE 12

| | Amount of (D-2) (parts by weight) | Extrusion Moldability | Blocking of Film | Adhesive Durability against Moisture (kg/cm) | | |
|---|---|---|---|---|---|---|
| | | | | 0 day | 20 days | 40 days |
| Example 63 | 1 | ○ | ○ | 2.3 | 1.8 | 1.2 |
| Example 64 | 5 | ○~△ | ○~△ | 2.6 | 2.3 | 1.7 |
| Example 65 | 10 | ○~△ | ○ | 3.4 | 2.3 | 2.0 |

EXAMPLES 66 TO 73 AND COMPARATIVE EXAMPLES 25 TO 28

Films producing using the compositions of Examples 28 to 33, 64 and 34 were evaluated for adhesive durability against moisture. The results are shown in Table 13.

For comparison, films produced using the compositions of Comparative Examples 15, 16, 18, and 19 were also evaluated for adhesive durability against moisture. The results are shown in Table 13.

Evaluation Method

A soft polyvinyl chloride resin sheet (2 mm)/film of the composition (50 to 60μ)/epoxy group-containing ethylene copolymer (*) film (50μ)/soft aluminum (200μ) structure was prepared and bonded together under conditions of temperature of 180° C., time of 5 minutes, and pressure of 10 kg/cm². The thus-prepared laminate was cut to produce a 10 mm wide test piece. This test piece was soaked in hot water maintained at 70° C. for a given period of time, and then its peeling strength was measured at a tensile speed of 100 mm/min in the condition that the soft aluminum was bent at an angle of 180°.

*: Ethylene copolymer having a glycidyl methacrylate content of 10% by weight, a vinyl acetate content of 5% by weight, and a melt index of 7 g/10min.

TABLE 13

| | Adhesive Resin Composition | Adhesive Durability against Moisture (kg/cm) | | |
|---|---|---|---|---|
| | | 0 day | 20 days | 40 days |
| Example 66 | Example 28 | 4.2 | 4.8 | 3.1 |
| Example 67 | Example 29 | 5.1 | 5.0 | 3.9 |
| Example 68 | Example 30 | 3.9 | 3.2 | 2.4 |
| Example 69 | Example 31 | 4.5 | 3.9 | 3.9 |
| Example 70 | Example 32 | 4.5 | 3.0 | 1.8 |
| Example 71 | Example 33 | 3.8 | 3.5 | 3.1 |
| Example 72 | Example 64 | 5.0 | 3.4 | 2.7 |
| Example 73 | Example 34 | 4.4 | 2.8 | 1.0 |
| Comparative Example 25 | Comparative Example 15 | 0 | — | — |
| Comparative Example 26 | Comparative Example 16 | 0 | — | — |
| Comparative Example 27 | Comparative Example 18 | 1.0 | — | — |
| Comparative Example 28 | Comparative Example 19 | 5.3 | 0.3 | 0.1 |

EXAMPLES 74 AND 75

A film produced using the composition of Example 28 was evaluated for adhesion to a polyethylene terephthalate film. The adhesive durability against moisture was 2.2 kg/cm.

In the same manner as above, a film of the composition of Example 34 was evaluated for adhesion to a polyethylene terephthalate film. The adhesive durability against moisture was 1.0 kg/cm.

While the invention has been described in detail and with reference to specific embodiments thereof, it will be apparent to one skilled in the art that various changes and modifications can be made therein without departing from the spirit and scope thereof.

What is claimed is:

1. An adhesive resin composition comprising from 40 to 80% by weight of component (A) and from 20 to 60% by weight of component (B), wherein said component (A) is a thermoplastic copolyester resin prepared from (1) a dicarboxylic acid component comprising from 60 to 95 mol% of terephthalic acid and from 5 to 40 mol% of isophthalic acid and (2) a low molecular weight glycol component comprising from 55 to 95 mol% of 1,4-butanediol and from 5 to 45 mol% of diethylene glycol and further from 0.1 to 4 mol%, based on the total carboxylic acid, of polytetramethylene glycol having a number average molecular weight of from 600 to 6,000, which has a melting point of from 100° to 150° C. and a reduced viscosity of at least 0.5; and said component (B) is a copolymer of ethylene and 0.01 to 20 mol% of an unsaturated monomer having at least one functional group selected from the group consisting of an epoxy group, a carboxylic acid group, and a dicarboxylic anhydride group.

* * * * *